United States Patent
Fukuda

(10) Patent No.: US 8,625,557 B2
(45) Date of Patent: Jan. 7, 2014

(54) COMMUNICATION DEVICE, COMMUNICATION SYSTEM, MODE SWITCHING METHOD, AND PROGRAM

(75) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 311 days.

(21) Appl. No.: 13/097,315

(22) Filed: Apr. 29, 2011

(65) Prior Publication Data

US 2011/0299512 A1    Dec. 8, 2011

(30) Foreign Application Priority Data

Jun. 8, 2010    (JP) .................. 2010-131344

(51) Int. Cl.
*H04B 5/00*    (2006.01)
(52) U.S. Cl.
USPC ........... 370/338; 370/311; 370/315; 370/350; 455/41.1
(58) Field of Classification Search
USPC .............. 370/338, 311, 315, 350; 455/41.1; 340/5.64, 5.1, 5.2, 5.65
See application file for complete search history.

(56) References Cited

U.S. PATENT DOCUMENTS

| | | | | |
|---|---|---|---|---|
| 5,796,827 | A * | 8/1998 | Coppersmith et al. | 713/182 |
| 6,771,161 | B1 * | 8/2004 | Doi et al. | 340/5.64 |
| 8,054,159 | B2 * | 11/2011 | Hyoung et al. | 340/5.64 |
| 8,368,527 | B2 * | 2/2013 | Kano et al. | 340/531 |
| 2005/0097220 | A1 * | 5/2005 | Koshiji | 709/238 |
| 2008/0174554 | A1 * | 7/2008 | Zhao | 345/163 |
| 2010/0234756 | A1 * | 9/2010 | Hyoung et al. | 600/547 |
| 2010/0277763 | A1 * | 11/2010 | Aoyama et al. | 358/1.15 |

FOREIGN PATENT DOCUMENTS

JP    2010-21984    1/2010

* cited by examiner

*Primary Examiner* — Rasheed Gidado
(74) *Attorney, Agent, or Firm* — Oblon, Spivak, McClelland, Maier & Neustadt, L.L.P.

(57) ABSTRACT

Provided is a communication device including a first communication unit for performing communication by a communication scheme, the communication scheme being for applying voltage from a signal electrode that is in contact with or that is brought into proximity of a human body, generating an electric near field on a human body surface and performing transmission, a second communication unit different from the first communication unit, a switching signal detection unit for detecting, from signals intermittently received by the first communication unit, a mode switching signal for switching the second communication unit from a power save mode to a normal mode, and a switching control unit for switching the second communication unit from the power save mode to the normal mode in a case the mode switching signal is detected by the switching signal detection unit.

16 Claims, 13 Drawing Sheets

COMMUNICATION DEVICE, COMMUNICATION SYSTEM, MODE SWITCHING METHOD, AND PROGRAM

BACKGROUND OF THE INVENTION

1. Field of the Invention

The present invention relates to a communication device, a communication system, a mode switching method, and a program.

2. Description of the Related Art

In recent years, human body communication for transmitting/receiving information with a human body as a transmission medium is gaining attention. The human body communication is a communication method of forming a capacitive coupling by applying voltage to a signal electrode that is in contact with or that is brought into proximity of a human body, and transmitting/receiving a signal by using the formed capacitive coupling. This human body communication has advantages in that its power consumption is low compared to wireless communication such as wireless LAN, and in that it has high confidentiality.

Furthermore, since communication is started by the signal electrode being brought into contact or proximity with a human body, a user can really feel that communication is actually being performed. Thus, realization of an intuitive interface that uses the human body communication is also expected. In relation to the human body communication, JP 2010-21984A discloses a configuration of a communication device that applies a wireless LAN modulation scheme or a communication protocol to the human body communication and that shares structural elements between the wireless LAN and the human body communication.

SUMMARY OF THE INVENTION

Generally, due to specifications such as transmission rate, modulation scheme, communication scheme, and the like, it is difficult for means providing a wireless LAN to maintain a state of waiting for a signal at low power consumption. Accordingly, to suppress power consumption, a mobile phone or the like provided with a wireless LAN function adopts a mechanism for a user to manually switch to a wireless LAN mode at the time of using the wireless LAN. However, the mechanism for a user to take a portable appliance such as the mobile phone out of the pocket or the like and to manually switch to a wireless LAN mode is inconvenient.

Accordingly, a mechanism of increasing the convenience by using the human body communication that is capable of waiting for a signal at low power consumption is being considered. However, in a case the wireless LAN and the human body communication share the structural elements, as with the communication device described in the patent document mentioned above, a mechanism for a user to manually switch to a human body communication mode at the time of using the human body communication becomes necessary due to the specifications of the wireless LAN. Additionally, the wireless LAN is taken as an example here, but a mechanism for a user to manually activate an exclusive use mode, as with the wireless LAN, is also adopted by Bluetooth (registered trademark; hereinafter, BT), infrared communication, and the like.

In light of the foregoing, it is desirable to provide a communication device, a communication system, a mode switching method, and a program which are novel and improved, and which are capable of increasing the convenience of a user by using the human body communication. For example, the present invention aims to enable, by a communication device, start/end of communication such as wireless LAN while a user is wearing the communication device on his/her person.

According to an embodiment of the present invention, there is provided a communication device which includes a first communication unit for performing communication by a communication scheme, the communication scheme being for applying voltage from a signal electrode that is in contact with or that is brought into proximity of a human body, generating an electric near field on a human body surface and performing transmission, a second communication unit different from the first communication unit, a switching signal detection unit for detecting, from signals intermittently received by the first communication unit, a mode switching signal for switching the second communication unit from a power save mode to a normal mode, and a switching control unit for switching the second communication unit from the power save mode to the normal mode in a case the mode switching signal is detected by the switching signal detection unit.

The communication device may further include a third communication unit different from the first and second communication units. In this case, the mode switching signal includes type information for causing the second communication unit to be selected as a target to be switched from the power save mode to the normal mode, and the switching control unit selects the second communication unit based on the type information included in the mode switching signal detected by the switching signal detection unit, and switches the second communication unit from the power save mode to the normal mode.

The mode switching signal may be an unmodulated carrier. Furthermore, the mode switching signal may be a combination of an unmodulated carrier and a modulated carrier.

The communication device may further include an arithmetic processing unit for generating transmission data. In this case, the second communication unit transmits the transmission data generated by the arithmetic processing unit after being switched from the power save mode to the normal mode by the switching control unit.

According to another embodiment of the present invention, there is provided a communication device which includes a signal electrode to which voltage is to be applied, a first communication unit for performing communication by a communication scheme, the communication scheme being for applying voltage to the signal electrode that is in contact with or that is brought into proximity of a human body, generating an electric near field on a human body surface and performing transmission, a second communication unit different from the first communication unit, and a switching signal transmission unit for transmitting, by the first communication unit, a mode switching signal for causing communication means, corresponding to the second communication unit, of a counterpart device to switch from a power save mode to a normal mode.

The mode switching signal may include type information for causing the communication means, corresponding to the second communication unit, of the counterpart device to be selected as a target to be switched from the power save mode to the normal mode. Furthermore, the mode switching signal may be an unmodulated carrier. Furthermore, the mode switching signal may be a combination of an unmodulated carrier and a modulated carrier.

The communication device may further include an arithmetic processing unit for generating transmission data. In this case, the second communication unit transmits the transmission data generated by the arithmetic processing unit after the communication means of the counterpart device is switched from the power save mode to the normal mode according to the mode switching signal transmitted by the switching signal transmission unit.

The communication device may further include a touch pad for a user to input information by touching it with a part of a body. In this case, the signal electrode is placed near the touch pad.

The communication device may further include a mouse connected by wire or wirelessly. In this case, at least the signal electrode is provided in the mouse.

The second communication unit may be a wireless communication unit providing a wireless LAN function. In this case, a channel number for connecting to an access point, identification information of the access point, and key information used for encryption are included in the mode switching signal.

According to another embodiment of the present invention, there is provided a communication system which includes a first communication device including a first communication unit for performing communication by a communication scheme, the communication scheme being for applying voltage from a signal electrode that is in contact with or that is brought into proximity of a human body, generating an electric near field on a human body surface and performing transmission, a second communication unit different from the first communication unit, a switching signal detection unit for detecting, from signals intermittently received by the first communication unit, a mode switching signal for switching the second communication unit from a power save mode to a normal mode, and a switching control unit for switching the second communication unit from the power save mode to the normal mode in a case the mode switching signal is detected by the switching signal detection unit, and a second communication device including a third communication unit for performing communication by a same communication scheme as the first communication unit, a fourth communication unit different from the third communication unit, and a switching signal transmission unit for transmitting, by the third communication unit, the mode switching signal for causing the second communication unit of the first communication device to switch from the power save mode to the normal mode.

According to another embodiment of the present invention, there is provided a mode switching method performed by a communication device including a first communication unit for performing communication by a communication scheme, the communication scheme being for applying voltage from a signal electrode that is in contact with or that is brought into proximity of a human body, generating an electric near field on a human body surface and performing transmission, and a second communication unit different from the first communication unit, which includes the steps of detecting, from signals intermittently received by the first communication unit, a mode switching signal for switching the second communication unit from a power save mode to a normal mode, and switching the second communication unit from the power save mode to the normal mode in a case the mode switching signal is detected in the step of detecting.

According to another embodiment of the present invention, there is provided a program causing a computer to realize a first communication function of performing communication by a communication scheme, the communication scheme being for applying voltage from a signal electrode that is in contact with or that is brought into proximity of a human body, generating an electric near field on a human body surface and performing transmission, a second communication function different from the first communication function, a switching signal detection function of detecting, from signals intermittently received by the first communication function, a mode switching signal for switching a communication mode of the second communication function from a power save mode to a normal mode, and a switching control function of switching the communication mode of the second communication function from the power save mode to the normal mode in a case the mode switching signal is detected by the switching signal detection function.

According to another embodiment of the present invention, there is provided a computer-readable recording medium in which the program is recorded.

According to the embodiments of the present invention described above, it is possible to increase the convenience of a user by using the human body communication. For example, communication such as wireless LAN can be started/ended by a communication device while a user is wearing the communication device on his/her person.

DETAILED DESCRIPTION OF THE EMBODIMENT(S)

Figure 1:
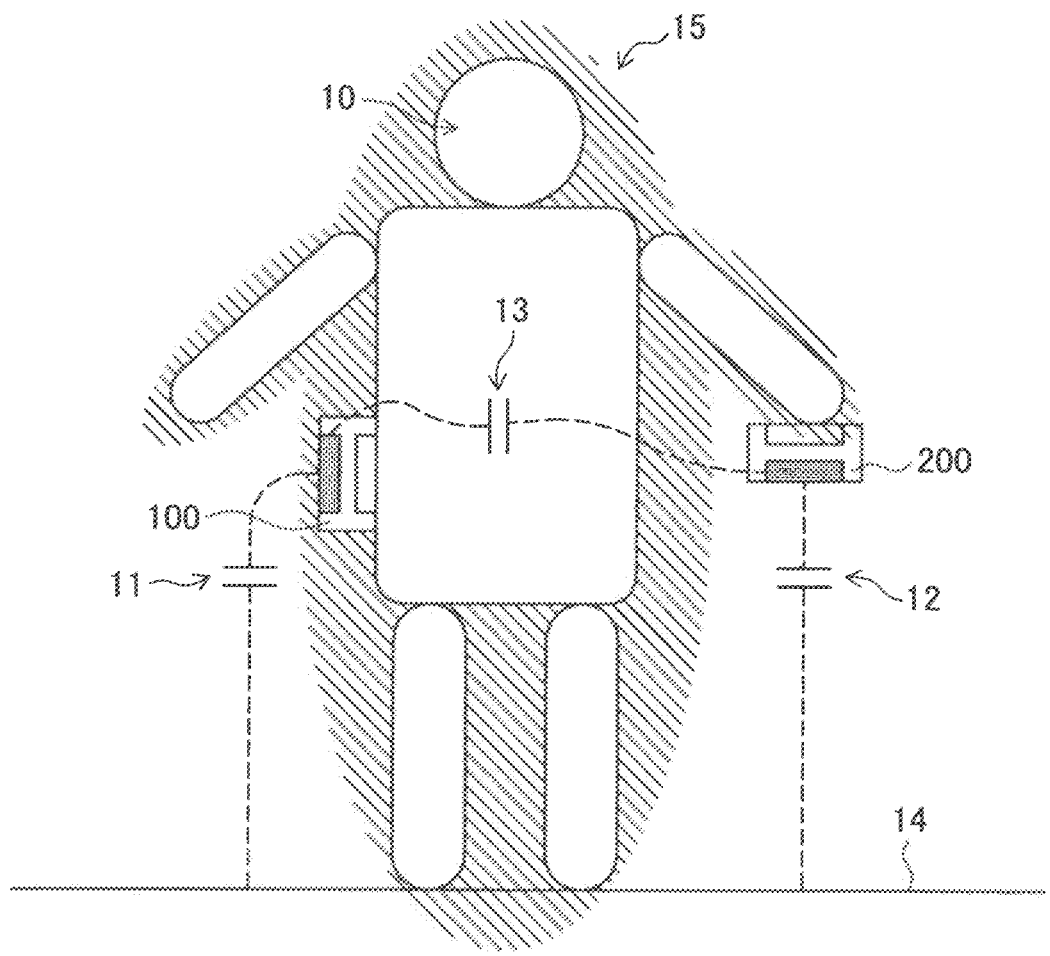
FIG. 1 is an explanatory diagram for describing a principle of human body communication.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Description]

The flow of description of an embodiment of the present invention which will be described below will be briefly mentioned here. First, a principle of human body communication will be described with reference to FIG. 1. Then, a use mode of the human body communication will be described with reference to FIG. 2.

Next, a functional configuration of an information processing apparatus according to an embodiment of the present invention will be described with reference to FIG. 3. Then, a placement configuration of human body communication block and signal electrode according to the embodiment will be described with reference to FIG. 4. Then, a functional configuration of a portable terminal according to the embodiment will be described with reference to FIG. 5. Then, configurations of an activation signal according to the embodiment will be described with reference to FIGS. 6 and 7. Then, a spectral configuration of the activation signal according to the embodiment will be described with reference to FIG. 8.

Next, a detailed configuration of an activation signal detection unit included in the portable terminal according to the embodiment will be described with reference to FIG. 9. Then, a configuration of an enable signal (Enable) used at the activation signal detection unit included in the portable terminal according to the embodiment will be described with reference to FIG. 10. Then, an activation method of communication means according to the embodiment will be described with reference to FIG. 11. At this time, a supplementary explanation of a concrete configuration of a WakeUp signal will be given with reference to FIG. 13.

Next, a hardware configuration capable of realizing a function of application units included in the portable terminal and the information processing apparatus according to the embodiment will be described with reference to FIG. 12. Lastly, the technical idea of the embodiment will be summarized and operational effects obtained by the technical idea will be briefly described.

(Description Items)

1: Introduction
   1-1: Principle of Human Body Communication
   1-2: Use Mode of Human Body Communication
2: Embodiment
   2-1: Functional Configuration of Information Processing Apparatus 200
   2-2: Functional Configuration of Portable Terminal 100
      2-2-1: Configuration of Activation Signal
      2-2-2: Details of Activation Signal Detection Unit 115
   2-3: Selection Method of Communication Means by Activation Signal
3: Hardware Configuration
4: Summary 1: Introduction Before describing an embodiment of the present invention in detail, a principle of human body communication and a use mode of the human body communication will be briefly described.

[1-1: Principle of Human Body Communication]

First, a principle of human body communication will be briefly described with reference to FIG. 1. FIG. 1 is an explanatory diagram for briefly describing a principle of human body communication. In the example of FIG. 1, a human body 10 is wearing a transmitter (portable terminal 100) on person. Also, in the example of FIG. 1, the human body 10 is touching a receiver (information processing apparatus 200). Furthermore, the transmitter and the receiver each have a signal electrode and a ground electrode. The signal electrodes of the transmitter and the receiver are in contact with the human body 10. Additionally, the signal electrodes do not have to be in direct contact with the human body 10. For example, clothes or the like may be present between the signal electrodes and the human body 10.

Since the human body 10 is a dielectric, when AC voltage is applied to the signal electrode of the transmitter, an electric field (a near field 15) is generated around the human body 10. For example, in the case of using a frequency band of 30 MHz, the dielectric constant of the human body 10 is about 90 and, therefore, a strong near field 15 is generated on the surface of the human body 10. A signal emitted from the signal electrode of the transmitter reaches the signal electrode of the receiver via this near field 15. Additionally, a frequency band (for example, 30 MHz or less) that does not use space propagation and that is not strictly restricted by protection guidelines for human body is suitably used for the human body communication.

Now, what is important here is the behaviour on the ground side which is a return wire for a signal. The ground electrode of the transmitter has a capacitance 11 to a ground 14. Additionally, in the example of FIG. 1, the capacitance 11 is schematically shown by one capacitor, but in reality, a large number of capacitive couplings are formed between the ground electrode and the ground 14. The ground electrode of the receiver similarly has a capacitance 12 to the ground 14. Furthermore, a capacitance 13 is present between the ground electrode of the transmitter and the ground electrode of the receiver. The sum of the capacitances 11, 12, and 13 will be the return wire for a signal transmitted from the transmitter to the receiver. Additionally, in the case of using a frequency band of 30 MHz, the capacitances 11, 12, and 13 are sufficiently small values, and thus the external environment has almost no influence on propagation characteristics.

In the foregoing, a principle of the human body communication has been briefly described.

[1-2: Use Mode of Human Body Communication]

Figure 2:
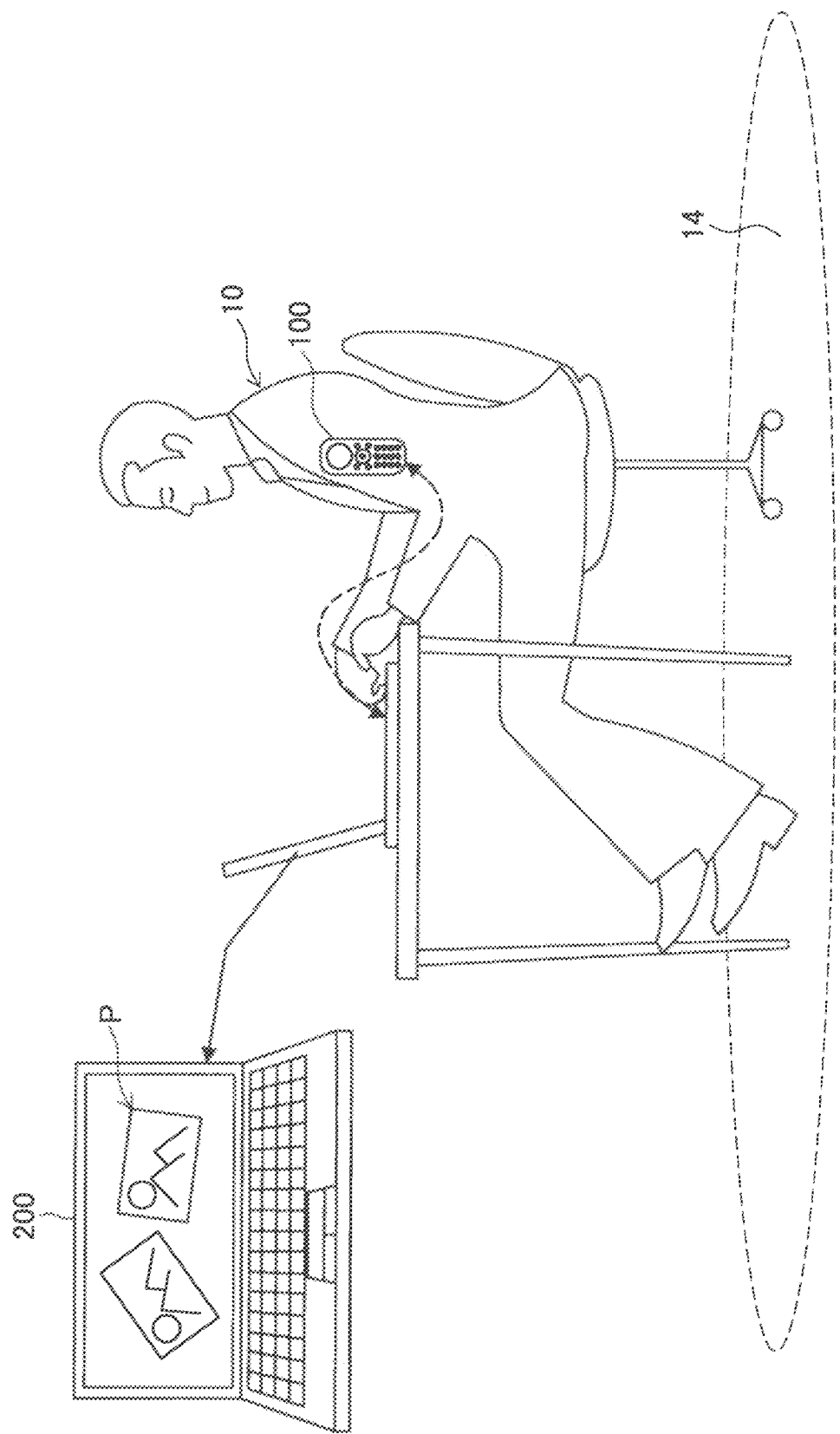
FIG. 2 is an explanatory diagram for describing a use mode of the human body communication.

Next, a use mode of the human body communication will be described with reference to FIG. 2. FIG. 2 is an explanatory diagram for describing a use mode of the human body communication. FIG. 2 shows a situation where the human body communication is performed between the portable terminal 100 worn on a user's person and the information processing apparatus 200.

When a part of the human body 10 touches the information processing apparatus 200 and the human body communication is started between the portable terminal 100 and the information processing apparatus 200, the near field 15 is generated and transmission/reception of information between the portable terminal 100 and the information processing apparatus 200 via the human body is enabled. For example, when the human body communication is started, data of an image P stored in the portable terminal 100 is sent to the information processing apparatus 200 and the image P is displayed on a display screen of the information processing apparatus 200.

Furthermore, personal information data (for example, address book data or the like) input using the information processing apparatus 200 can be sent to the portable terminal 100 over the human body communication. Since, according to the human body communication, information is transmitted/received via the human body 10, high confidentiality can be achieved compared to the wireless LAN or the like.

Accordingly, the human body communication is suitable for transmission/reception of data such as personal information leakage of which is a matter of concern. Additionally, in the use mode illustrated in FIG. 2, the floor acts as the ground 14.

In the foregoing, a use mode of the human body communication has been described.

2: Embodiment

In the following, an embodiment of the present invention will be described. The present embodiment relates to a technology of reducing the power consumption of the portable terminal 100 and the information processing apparatus 200 by switching a communication mode using the human body communication. The present embodiment also relates to a mechanism of switching the communication mode without a user taking out the portable terminal 100 worn on the user's person.

[2-1: Functional Configuration of Information Processing Apparatus 200]

First, a functional configuration of the information processing apparatus 200 according to the present embodiment will be described with reference to FIG. 3. FIG. 3 is an explanatory diagram for describing a functional configuration of the information processing apparatus 200 according to the present embodiment.

Figure 3:
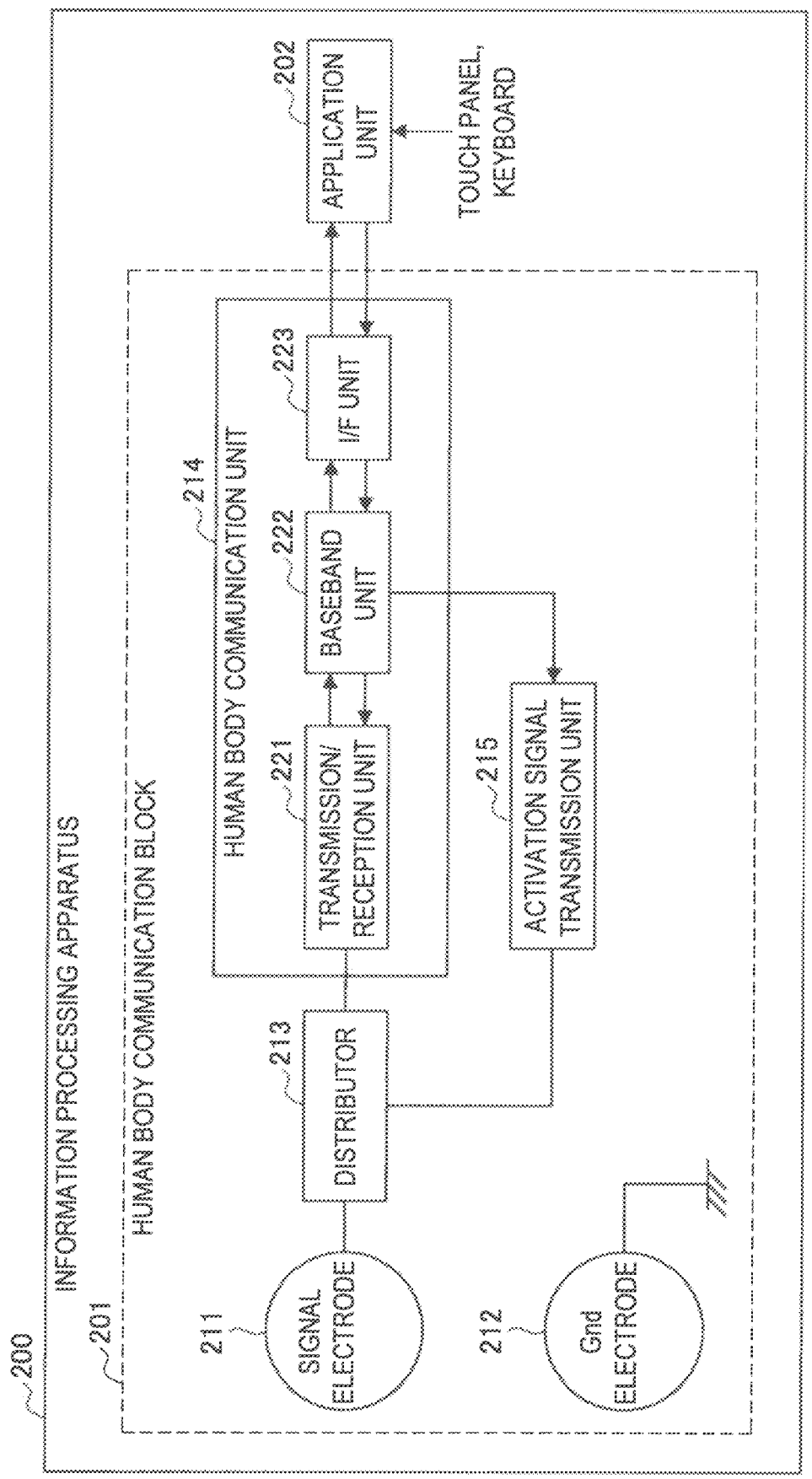
FIG. 3 is an explanatory diagram for describing a functional configuration of an information processing apparatus according to an embodiment of the present invention.

As shown in FIG. 3, the information processing apparatus 200 is mainly configured from a human body communication block 201, and an application unit 202. The human body communication block 201 includes a signal electrode 211, a ground electrode 212, a distributor 213 (or a high-frequency switch), a human body communication unit 214, and an activation signal transmission unit 215. Furthermore, the human body communication unit 214 includes a transmission/reception unit 221, a baseband unit 222, and an interface unit 223.

Additionally, the application unit 202 provides a main function of a personal computer (hereinafter, a PC). Also, the function of the application unit 202 is realized by a hardware configuration as shown in FIG. 12. Furthermore, the ground electrode 212 for forming a part of the return wire in the human body communication may be configured by making use of a ground plane (not shown) of a substrate of the information processing apparatus 200, for example.

(Operation at the Time of Transmission)

First, data to be transmitted to the portable terminal 100 is output from the application unit 202. The data output from the application unit 202 is input to the baseband unit 222 via the interface unit 223. The baseband unit 222 modulates the input data and generates a transmission signal. The baseband unit 222 also performs control of a communication protocol or the like. The transmission signal generated by the baseband unit 222 is input to the transmission/reception unit 221, and is transmitted from the signal electrode 211 via the distributor 213. At this time, the transmission/reception unit 221 applies AC voltage to the signal electrode 211 and generates a signal electric field. Additionally, a shortwave band (for example, a frequency band of 30 MHz or less) is used for transmission of the transmission signal.

(Operation at the Time of Reception)

First, a signal is received by the transmission/reception unit 221 via the signal electrode 211. The signal received by the transmission/reception unit 221 is input to the baseband unit 222. When the received signal is input, the baseband unit 222 demodulates the input received signal and generates received data. The received data generated by the baseband unit 222 is input to the application unit 202 via the interface unit 223. When the received data is input, the application unit 202 performs processing in accordance with the input received data (for example, display of an image in accordance with the received data).

(Activation Signal Transmission Unit 215)

As described above, the human body communication unit 214 is means for providing a fundamental function for the human body communication at the information processing apparatus 200. The information processing apparatus 200 can realize transmission/reception of information by the human body communication by using the function of this human body communication unit 214. The information processing apparatus 200 also includes the activation signal transmission unit 215. This activation signal transmission unit 215 is means for switching a communication mode of the portable terminal 100 by using the human body communication, and activating a specific communication function.

First, when an input is received from a user, via a touch panel, a keyboard, or the like connected to the application unit 202, to activate a specific communication function of the portable terminal 100, this input is notified to the baseband unit 222 from the application unit 202. The baseband unit 222 which has received this notification instructs the activation signal transmission unit 215 to transmit an activation signal to the portable terminal 100 using the human body communication. When this instruction is received, the activation signal transmission unit 215 applies AC voltage to the signal electrode 211 via the distributor 213 and generates a signal electric field, and transmits the activation signal to the portable terminal 100 by using the human body communication.

Figure 6:
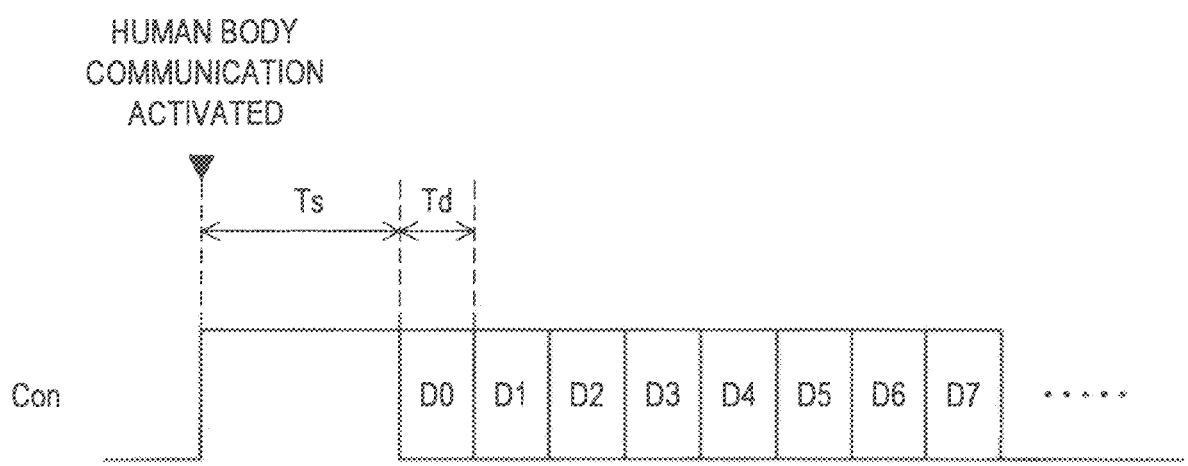
FIG. 6 is an explanatory diagram for describing a configuration of an activation signal according to the embodiment.

Additionally, the activation signal transmission unit 215 may be configured to transmit, as the activation signal, only a carrier (see FIG. 7), or may be configured to transmit, as the activation signal, a carrier to which a specific signal has been added (see FIG. 6). Also, a frequency band around 2 MHz, for example, is used for a carrier frequency used at the time of transmission of the activation signal so that the carrier frequency does not overlap with the frequency band used by the human body communication unit 214. Furthermore, a configuration where the human body communication unit 214 and the activation signal transmission unit 215 shares the signal electrode 211 is shown in the example of FIG. 3, but a configuration where the human body communication unit 214 and the activation signal transmission unit 215 use separate signal electrodes is also possible.

(Placement of Signal Electrode 211 or the Like)

Figure 4:
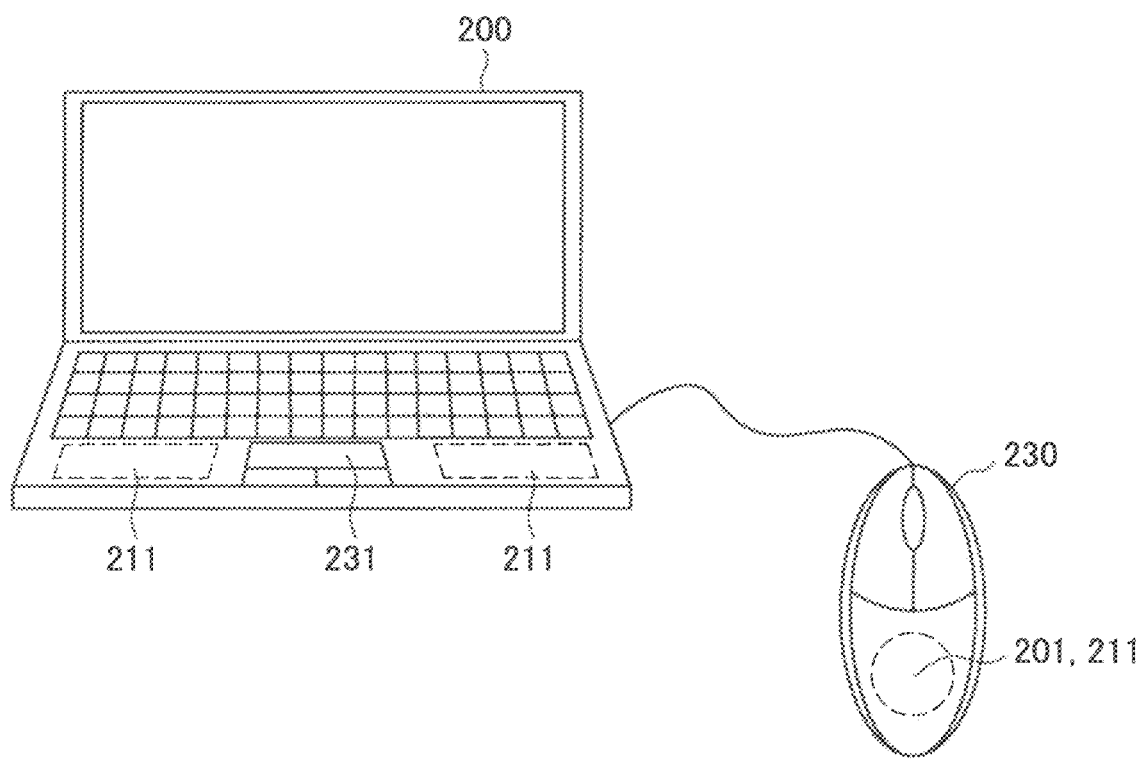
FIG. 4 is an explanatory diagram for describing a placement configuration of human body communication block and signal electrode according to the embodiment.

Here, a supplementary explanation of placement of the signal electrode 211 will be given with reference to FIG. 4. The signal electrode 211 is preferably placed at a position convenient for a user according to the form of the information processing apparatus 200 or the like. For example, as shown in FIG. 4, if the signal electrode 211 is placed next to a touch pad 231 (on one side or both sides) of the information processing apparatus 200, a user can easily operate the keyboard or the like while touching the signal electrode 211.

Furthermore, if the signal electrode 211 is placed next to the touch pad 231, the hand is removed from the signal electrode 211 at the time of the user operating a mouse 230. Therefore, the signal electrode 211 may be provided at a holding portion of the mouse 230 which is connected to the information processing apparatus 200 by a USB or the like. Furthermore, the mouse 230 may have the human body communication block 201 built therein. Additionally, in the case of mounting the signal electrode 211 on the housing of the information processing apparatus 200 or the mouse 230, the signal electrode 211 does not have to be exposed on the surface of the housing of the information processing apparatus 200 or the mouse 230. For example, if the signal electrode 211 is provided inside a housing formed from plastic, resin, or the like, a capacitive coupling can be formed between the signal electrode 211 and the human body 10.

In the foregoing, a functional configuration of the information processing apparatus 200 according to the present embodiment has been described.

[2-2: Functional Configuration of Portable Terminal 100]

Figure 5:
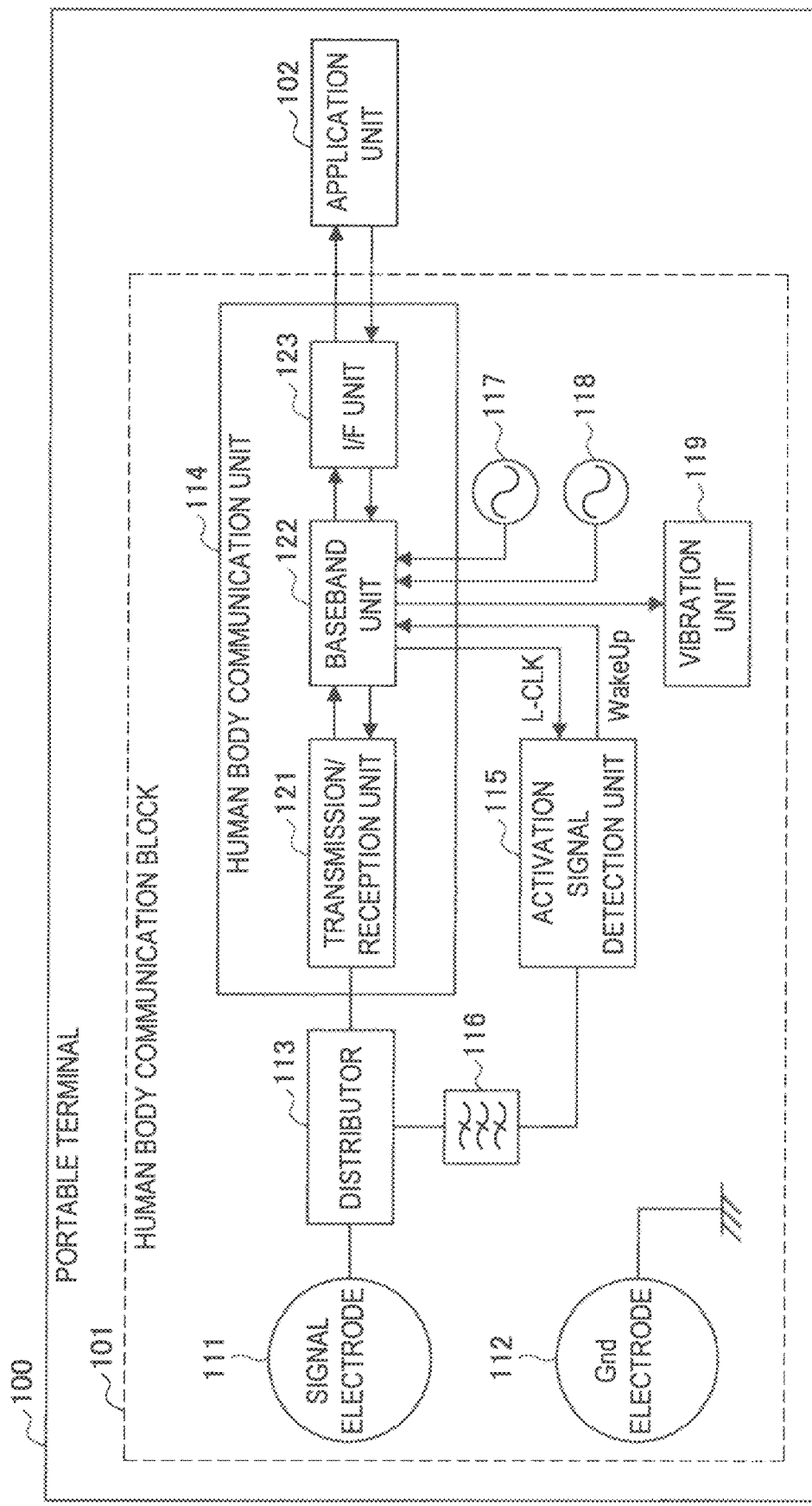
FIG. 5 is an explanatory diagram for describing a functional configuration of a portable terminal according to the embodiment.

Next, a functional configuration of the portable terminal 100 according to the present embodiment will be described with reference to FIG. 5. FIG. 5 is an explanatory diagram for describing a functional configuration of the portable terminal 100 according to the present embodiment.

As shown in FIG. 5, the portable terminal 100 is mainly configured from a human body communication block 101, and an application unit 102. The human body communication block 101 includes a signal electrode 111, a ground electrode 112, a distributor 113 (or a high-frequency switch), a human body communication unit 114, and an activation signal detection unit 115. Furthermore, the human body communication block 101 includes a band-pass filter 116, a low-speed clock generator 117, a high-speed clock generator 118, and a vibration unit 119. Furthermore, the human body communication unit 114 includes a transmission/reception unit 121, a baseband unit 122, and an interface unit 123.

Additionally, the application unit 102 provides a main function of a mobile phone, a PDA, a portable music player, or the like. Also, the function of the application unit 102 is realized by a hardware configuration as shown in FIG. 12. Furthermore, the ground electrode 112 for forming a part of the return wire in the human body communication may be configured by making use of a ground plane (not shown) of a substrate of the portable terminal 100, for example.

(Communication Mode)

The portable terminal 100 has a normal mode and a sleep mode. The normal mode is a state where information can be transmitted/received at high speed by using a high-speed clock generated by the high-speed clock generator 118. On the other hand, the sleep mode is a state where the high-speed clock generator 118 is stopped and only transmission/reception of information at low speed using a low-speed clock generated by the low-speed clock generator 117 is enabled. In the sleep mode, transmission/reception of information is performed with a low-speed clock, and, therefore, transmission rate of the information may be low but the power consumption can be greatly suppressed. In the case the portable terminal 100 is in a wait state, the communication mode is set to the sleep mode.

(Operation at the Time of Transmission in Normal Mode)

First, data to be transmitted to the information processing apparatus 200 is output from the application unit 102. The data output from the application unit 102 is input to the baseband unit 122 via the interface unit 123. The baseband unit 122 modulates the input data and generates a transmission signal. The baseband unit 122 also performs control of a communication protocol or the like. The transmission signal generated by the baseband unit 122 is input to the transmission/reception unit 121, and is transmitted from the signal electrode 111 via the distributor 113. At this time, the transmission/reception unit 121 applies AC voltage to the signal electrode 111 and generates a signal electric field. Additionally, a shortwave band (for example, a frequency band of 30 MHz or less) is used for transmission of the transmission signal.

(Operation at the Time of Reception in Normal Mode)

First, a signal is received by the transmission/reception unit 121 via the signal electrode 111. The signal received by the transmission/reception unit 121 is input to the baseband unit 122. When the received signal is input, the baseband unit 122 demodulates the input received signal and generates received data. The received data generated by the baseband unit 122 is input to the application unit 102 via the interface unit 123. When the received data is input, the application unit 102 performs processing in accordance with the input received data (for example, display of an image in accordance with the received data).

(Switching Operation of Communication Mode)

Switching from the sleep mode to the normal mode is performed according to an activation signal received from the information processing apparatus 200. When an activation signal is received via the signal electrode 111, the received activation signal is input to the band-pass filter 116 via the distributor 113. This band-pass filter 116 is a filter that passes only the frequency band of the activation signal. The activation signal which has passed the band-pass filter 116 is input to the activation signal detection unit 115.

The activation signal detection unit 115 has a low-speed clock (L-CLK) generated by the low-speed clock generator 117 input thereto via the baseband unit 122. Also, the activation signal detection unit 115 intermittently detects a carrier of an activation signal by the low-speed clock. When an activation signal is input from the band-pass filter 116, the activation signal detection unit 115 detects the input activation signal, and inputs a WakeUp signal to the baseband unit 122. This WakeUp signal is a signal for switching from an operation by a low-speed clock (the sleep mode) to an operation by a high-speed clock (the normal mode).

When the WakeUp signal is input, the baseband unit 122 activates the high-speed clock generator 118. Then, the baseband unit 122 operates the human body communication unit 114 by the high-speed clock generated by the high-speed clock generator 118, and switches the communication mode from the sleep mode to the communication mode. Furthermore, at the time of switching the communication mode from the sleep mode to the normal mode, the baseband unit 122 turns on the operation of the vibration unit 119 for a specific period of time, and causes vibration by the vibration unit 119. By vibrating the vibration unit 119 in this manner, a user can be notified of completion of switching to the normal mode.

(2-2-1: Configuration of Activation Signal)

A supplementary explanation of a configuration of the activation signal will be given here with reference to FIGS. 6 to 8.

FIG. 6 shows a signal configuration for a case where an unmodulated carrier and an on-off keying (OOK) signal are transmitted together as the activation signal. In the example of FIG. 6, first, an unmodulated carrier having a time length Ts is transmitted, and then, 8 bits of the OOK signal having a bit width Td are transmitted. The time length Ts in the leading part plays the role of activating the human body communication unit 114 of the portable terminal 100. On the other hand, the OOK signal of time length Td×n in the following part plays the role of switching the communication mode from the sleep mode to the normal mode. As described, in the case of the configuration where the OOK signal is added to the unmodulated carrier, probability of misoperation occurring due to external noise can be reduced compared to a case of transmitting only the unmodulated carrier.

Figure 7:
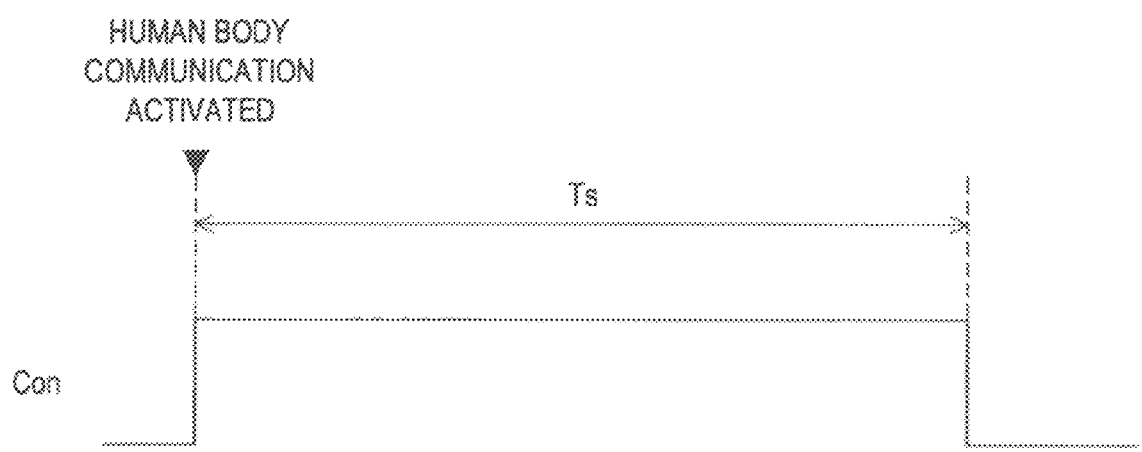
FIG. 7 is an explanatory diagram for describing a configuration of the activation signal according to the embodiment.

On the other hand, FIG. 7 shows a signal configuration of a case where only the unmodulated carrier is transmitted over a specific period of time as the activation signal. In the example of FIG. 7, an unmodulated carrier having a time length Ts is transmitted. As described above, in the case of transmitting only the unmodulated carrier, susceptibility to the influence of the external noise will be high. However, an active/inactive period of the human body communication can be easily controlled by, for example, continuously transmitting the unmodulated carrier only while the human body communication is performed.

Figure 8:
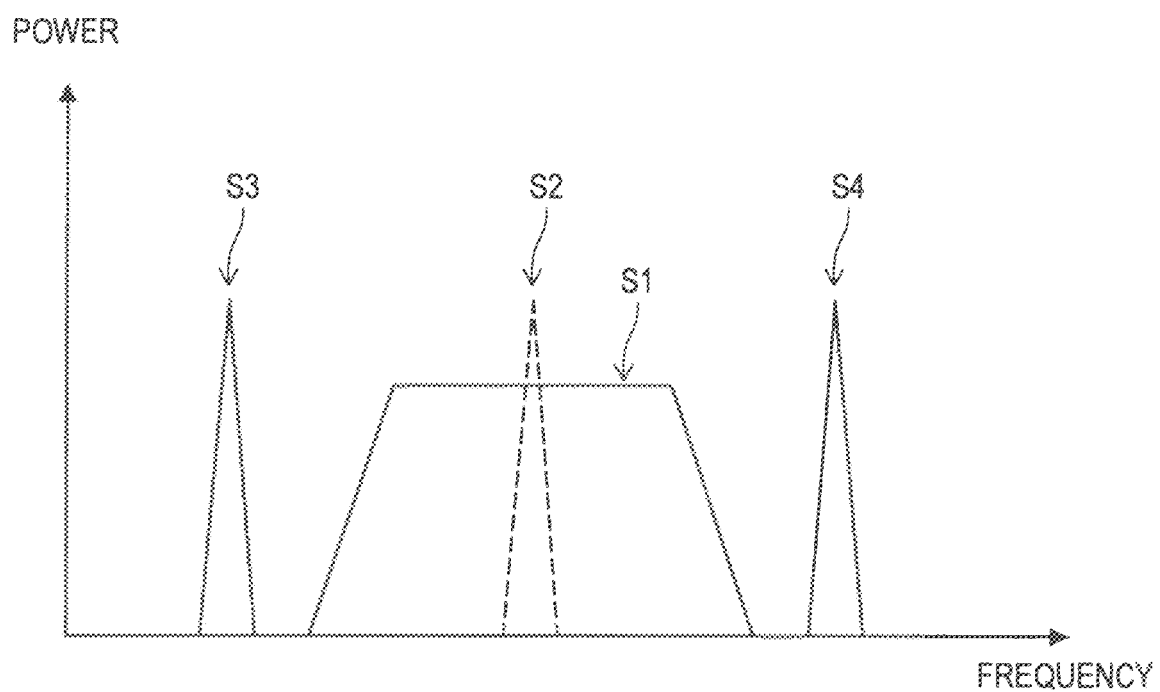
FIG. 8 is an explanatory diagram for describing a spectral configuration of the activation signal according to the embodiment.

A relationship between a frequency spectrum of the human body communication in the normal mode and a frequency spectrum of the activation signal will be considered here with reference to FIG. 8. S1 in FIG. 8 shows the frequency spectrum of the human body communication in the normal mode. On the other hand, S2 to S4 in FIG. 8 show the frequency spectra of the activation signal. Additionally, it is assumed that the human body communication in the normal mode is performed here using an Orthogonal Frequency Division Multiplexing (OFDM) modulation scheme.

In the case of using the activation signal only at the time of start of communication, the frequency spectrum of the activation signal may be set, like the frequency spectrum S2, in the same frequency band as the frequency spectrum S1 of the human body communication. However, in the case of continuously transmitting the activation signal during communication in the normal mode, to avoid mutual interference, the frequency spectrum of the activation signal has to be set, like the frequency spectra S3 and S4, in a band different from that of the frequency spectrum S1 of the human body communication.

(2-2-2: Details of Activation Signal Detection Unit 115)

The configuration of the activation signal detection unit 115 included in the portable terminal 100 will be described here in detail with reference to FIG. 9. FIG. 9 is an explanatory diagram for describing the configuration of the activation signal detection unit 115 included in the portable terminal 100 in greater detail.

Figure 9:
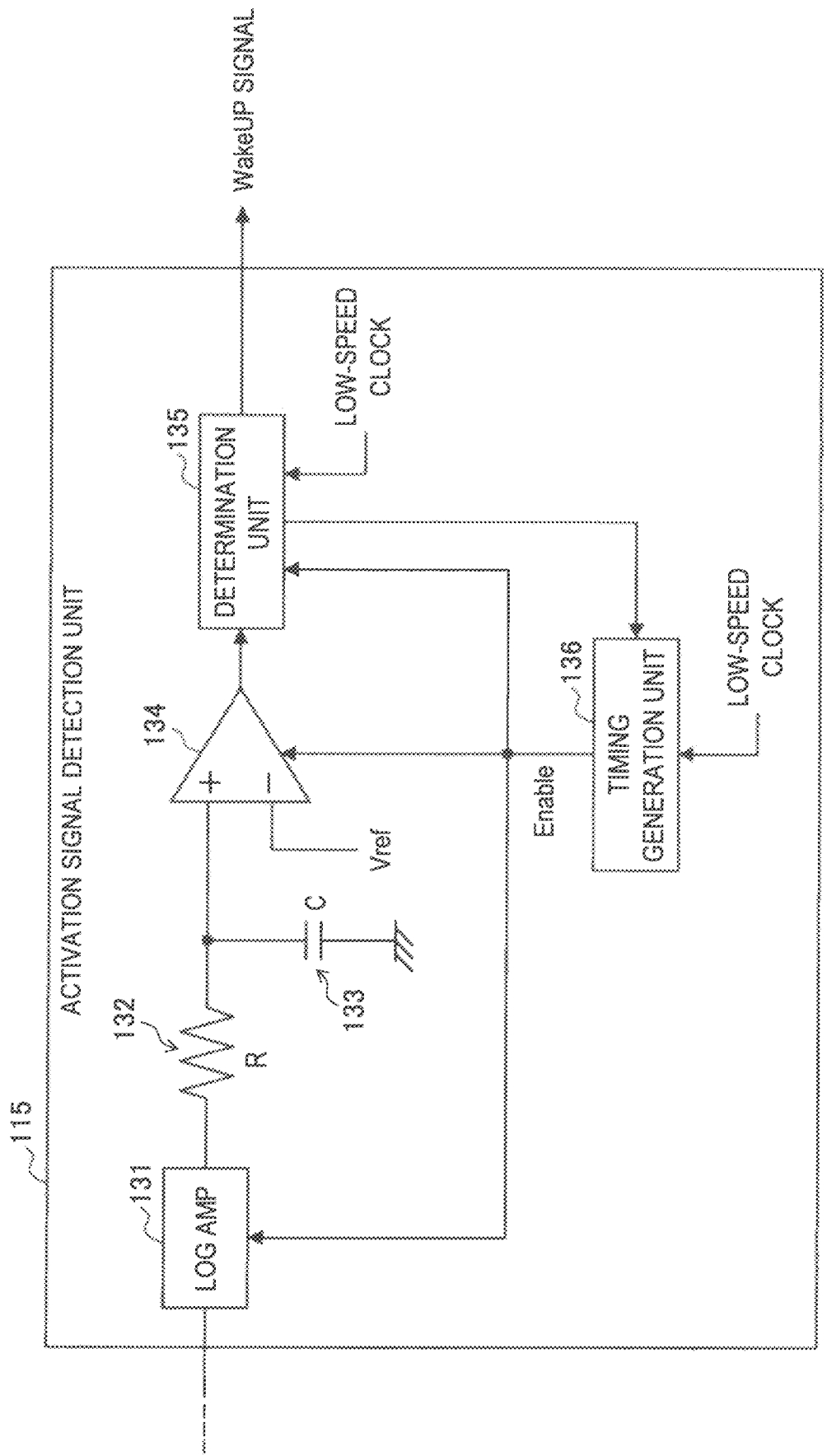
FIG. 9 is an explanatory diagram for describing a detailed configuration of an activation signal detection unit included in the portable terminal according to the embodiment.

As shown in FIG. 9, the activation signal detection unit 115 is configured from a logarithmic amplifier 131, a resistor 132, a capacitor 133, a comparator 134, a determination unit 135, and a timing generation unit 136.

Figure 10:
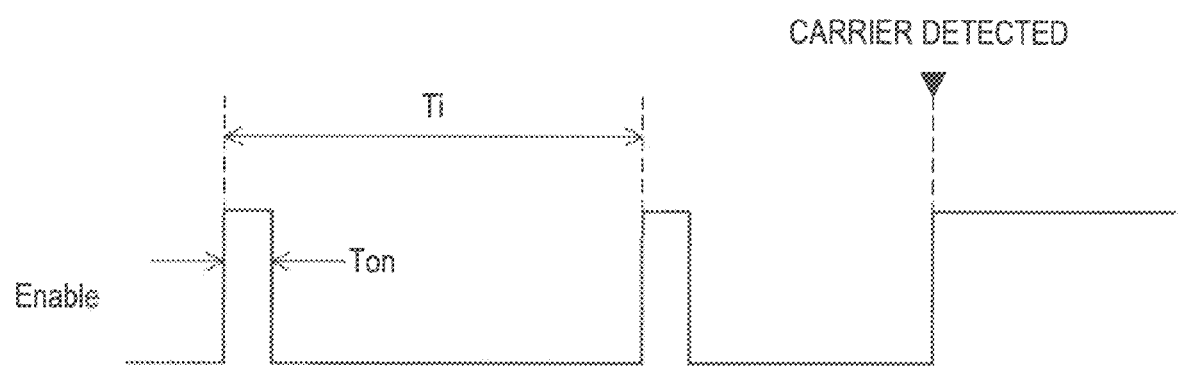
FIG. 10 is an explanatory diagram for describing a configuration of an enable signal (Enable) used at the activation signal detection unit included in the portable terminal according to the embodiment.

The activation signal detection unit 115 operates by a low-speed clock generated by the low-speed clock generator 117. Furthermore, the activation signal detection unit 115 operates intermittently at a predetermined cycle. The operation timing of the activation signal detection unit 115 is controlled by an enable signal (Enable) generated by the timing generation unit 136. For example, as shown in FIG. 10, the timing generation unit 136 emits an enable signal which will be on only during a time Ton (for example, 10 msec) and at a cycle Ti (for example, 1 sec).

The enable signal generated by the timing generation unit 136 is input to the logarithmic amplifier 131, the comparator 134, and the determination unit 135. With the activation signal detection unit 115 intermittently operating by the enable signal, the operating current can be greatly reduced. For example, when the Ti is 1 sec and the Ton is 10 msec, the operating current can be reduced to about 1/100 compared to a case of continuous operation. Additionally, when this configuration is implemented in a mobile phone or the like, the average power consumption in a wait state of structural elements other than the application unit 102 can be suppressed to about several tens of microwatts.

Now, when an activation signal is input to the activation signal detection unit 115, the input activation signal is input to the logarithmic amplifier 131. When the activation signal is input, the logarithmic amplifier 131 amplifies the input activation signal. Then, the logarithmic amplifier 131 outputs a received signal strength indicator (RSSI), which is a log-linear DC voltage, according to the strength of the input activation signal. The RSSI output from the logarithmic amplifier 131 is smoothed by the resistor 132 and the capacitor 133, and is input to the comparator 134.

The comparator 134 has a predetermined threshold Vref input thereto, in addition to the smoothed RSSI. When the input RSSI exceeds the predetermined threshold Vref, the comparator 134 outputs a high signal. The high signal output from the comparator 134 is input to the determination unit 135. In the case the activation signal detection unit 115 is operating in the time Ton where the enable signal is on and an unmodulated carrier of an activation signal is received, the determination unit 135 determines that an activation signal has been received.

Furthermore, in the case the activation signal includes an OOK signal, the determination unit 135 asynchronously takes in the OOK signal following the unmodulated carrier, and determines the data. When the input signal is determined to be an activation signal as a result of determination by the determination unit 135, the determination unit 135 inputs a WakeUp signal to the baseband unit 122. On the other hand, when the activation signal is a signal only of the unmodulated carrier, the determination unit 135 inputs a WakeUp signal to the baseband unit 122 together with taking in the unmodulated carrier.

In the foregoing, the configuration of the activation signal detection unit 115 has been described in greater detail. As described above, the power consumption can be reduced by intermittently operating the activation signal detection unit 115. Also, since operation is performed by a low-speed clock until an activation signal is received, the power consumption of the portable terminal 100 in a wait state can be greatly reduced. Also, since the communication mode of the portable terminal 100 is switched from the sleep mode to the normal mode using the human body communication, a user does not have to operate the portable terminal 100 at the time of switching the communication mode. As a result, a user does not have to take the portable terminal 100 out of the pocket or the like, and the convenience is enhanced.

In the foregoing, a functional configuration of the portable terminal 100 according to the present embodiment has been described. Additionally, a configuration of switching the communication mode (an operation mode using a high-speed clock, an operation mode using a low-speed clock) of the human body communication has been described above, but application to a configuration of switching the communication mode of other communication means such as the wireless LAN, the BT, and the like by using the human body communication is also possible. For example, modification into a configuration of switching, according to an activation signal transmitted by the human body communication, the sleep mode to the normal mode for means providing the wireless LAN is possible.

[2-3: Selection Method of Communication Means by Activation Signal]

Figure 11:
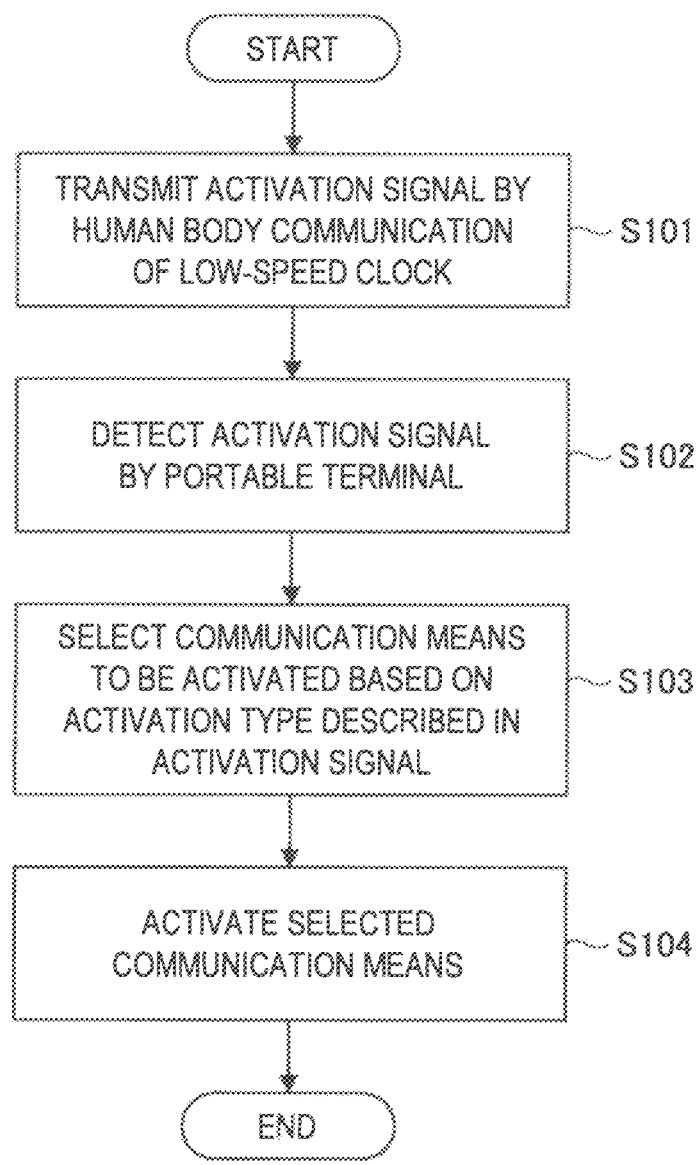
FIG. 11 is an explanatory diagram for describing an activation method of communication means according to the embodiment.

Next, a selection method of communication means using an activation signal transmitted by the human body communication will be described with reference to FIG. 11. FIG. 11 is an explanatory diagram for describing a selection method of communication means using an activation signal transmitted by the human body communication.

As described above, the configurations of the portable terminal 100 and the information processing apparatus 200 can be modified into a configuration of switching the communication mode of the wireless LAN, the BT, or the like. However, if a plurality of communication means (for example, human body communication, wireless LAN, BT, infrared communication, and the like) are implemented in the portable terminal 100, a mechanism for selecting communication means to be activated becomes necessary. Thus, the inventor of the present application has devised a mechanism for describing the type of communication means to be activated in an activation signal and transmitting the same. In the following, a process of selecting communication means and a process of activating the communication means of the portable terminal 100 and the information processing apparatus 200 adopting the mechanism will be described.

As shown in FIG. 11, first, an activation signal is transmitted from the information processing apparatus 200 to the portable terminal 100 (S101). Here, it is assumed that the portable terminal 100 is in a wait state and predetermined communication means is in the sleep mode. It is also assumed that information indicating the predetermined communication means (hereinafter, activation type) as the communication means whose communication mode is to be switched from the sleep mode to the normal mode is described in the activation signal. The activation signal transmitted from the information processing apparatus 200 is received by the portable terminal 100 and is input to the activation signal detection unit 115 (S102). When the activation signal is input, the activation signal detection unit 115 reads the activation type described in the activation signal, and selects communication means to be activated based on the activation type (S103).

The activation signal detection unit 115 which has selected the communication means inputs a WakeUp signal to the selected communication means (S104). For example, the activation signal detection unit 115 inputs the WakeUp signal to a baseband unit of means providing the wireless LAN. The communication means to which the WakeUp signal has been input switches the communication mode from the sleep mode to the normal mode. As described, by having the activation type described in the activation signal, desired communication means can be activated also at the portable terminal 100 implemented with a plurality of communication means by using a switching method of communication mode that uses the human body communication.

(Concrete Example of Wakeup Signal)

Figure 13:
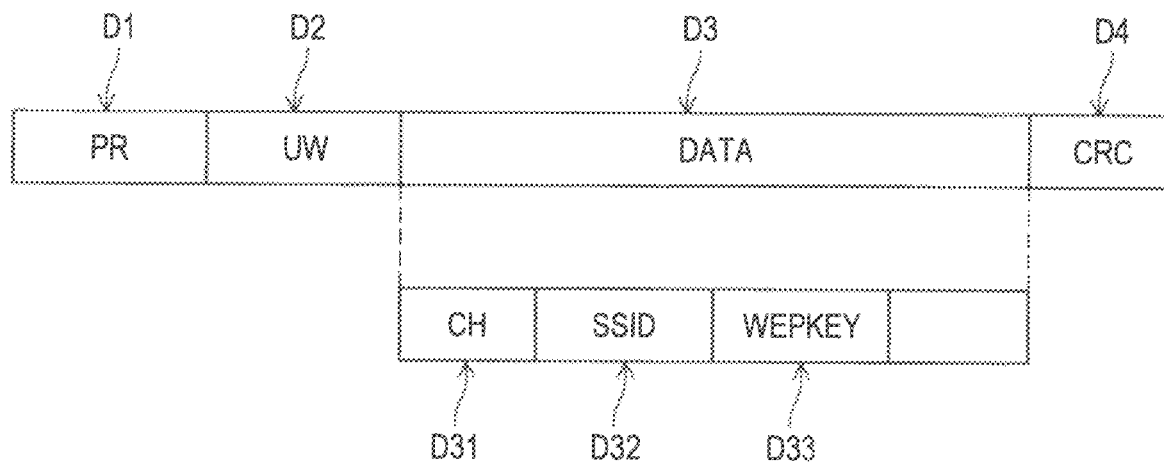
FIG. 13 is an explanatory diagram for describing a concrete example of a configuration of a WakeUp signal.

A supplementary explanation of a concrete configuration of the WakeUp signal used in a case of activating the wireless LAN by using the human body communication will be given here with reference to FIG. 13. FIG. 13 is an explanatory diagram for describing a concrete configuration of the WakeUp signal used in a case of activating the wireless LAN by using the human body communication.

Normally, when the wireless LAN is activated on the side of the portable terminal 100, the portable terminal 100 searches for an access point, existing in the vicinity, corresponding to a base station of the wireless LAN. For example, the portable terminal 100 scans all the channels and searches for a service set identifier (SSID) which is the ID of an access point to which the portable terminal 100 is to connect. When an access point having the target SSID is found, the portable terminal 100 connects to the access point.

An encryption key for increasing the security is necessary at this point. A wired equivalent privacy (WEP) key or the like is used as this encryption key, for example. In the case of using the WEP, same information (key) is set in the transmission side and the reception side, and encryption/decryption is performed using this key. Additionally, in the case of the WEP, since the key is static (64-bit or 128-bit) and weak, a new scheme with increased security is also being devised.

Now, for faster connection of the wireless LAN, a channel number (CH), the SSID, and the WEP key of the access point which is the connection target will be necessary. The WakeUp signal shown in FIG. 13 is configured from a preamble D1 (PR), a unique word D2 (UW), data D3 (DATA), and a cyclic redundancy check code D4 (CRC). Also, for faster connection of the wireless LAN, the data D3 is configured from a channel number D31, an SSID D32, and a WEPKEY D33. Additionally, the data D3 is error-checked by the cyclic redundancy check code D4.

The wireless LAN on the side of the portable terminal 100 receives the WakeUp signal (activation signal) illustrated in FIG. 13, and connection is started in the case the WakeUp signal is determined to be correct. At this time, the portable terminal 100 starts connection to the access point by using the channel number, the SSID, and the WEPKEY included in the received WakeUp signal. As described, the channel number, the SSID, and the WEPKEY are given by the WakeUp signal, and thus connection by the wireless LAN between the access point and the portable terminal 100 is established in a short time.

In the foregoing, an embodiment of the present invention has been described. As described above, by enabling switching of the communication mode of the portable terminal 100 by the information processing apparatus 200 by using the human body communication, desired communication means can be made usable without touching the portable terminal 100. For example, a user can switch predetermined communication means to a valid state without taking the portable terminal 100 out of the pocket, bag, or the like and operating the same. As a result, the convenience of the user is greatly enhanced.

3: Hardware Configuration

Figure 12:
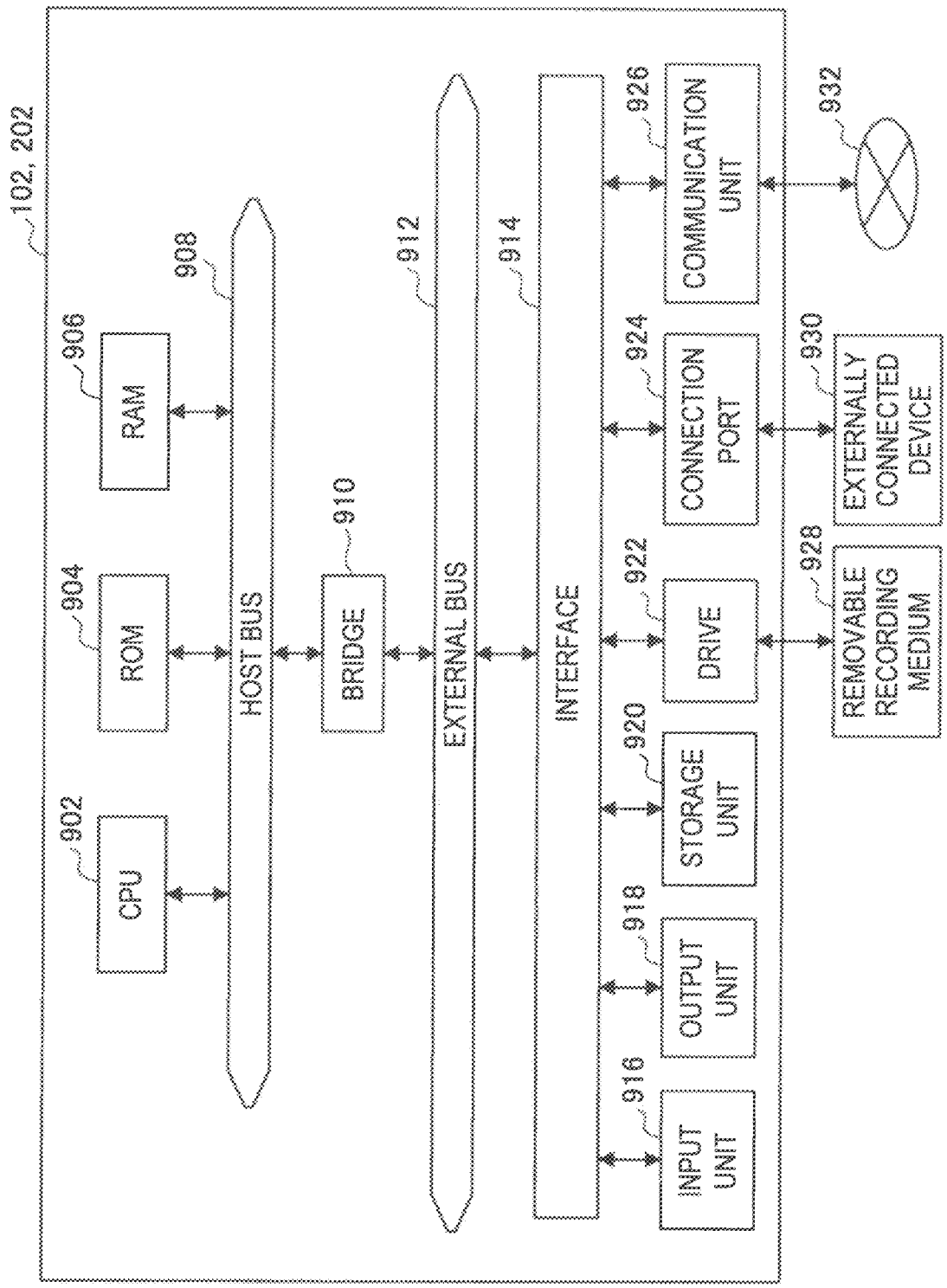
FIG. 12 is an explanatory diagram for describing a hardware configuration capable of realizing a function of application units included in the portable terminal and the information processing apparatus according to the embodiment.

The function of the application unit 102 of the portable terminal 100 and the application unit 202 of the information processing apparatus 200 according to the present embodiment can be realized by using, for example, the hardware configuration shown in FIG. 12. That is, the function of the application units 102 and 202 can be realized by controlling the hardware shown in FIG. 12 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 12, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

4: Summary

Lastly, the technical contents according to the embodiment of the present invention will be briefly described. The technical contents stated here can be applied to various information processing apparatuses, such as a personal computer, a mobile phone, a portable game machine, a portable information terminal, an information appliance, a car navigation system, and the like.

The functional configuration of the information processing apparatus described above can be expressed as follows. The information processing apparatus includes a first communication unit, a second communication unit, a switching signal detection unit, and a switching control unit as below. The first communication unit is means for performing communication by a first communication scheme, the first communication scheme being for applying voltage from a signal electrode that is in contact with or that is brought into proximity of a human body, generating an electric near field on a human body surface and performing transmission. Also, the second communication unit is means for performing communication by a second communication scheme different from the first communication scheme.

Furthermore, the switching signal detection unit is means for detecting, from signals intermittently received by the first communication unit, a mode switching signal for switching the second communication unit from a power save mode to a normal mode. Also, the switching control unit is means for switching the second communication unit from the power save mode to the normal mode in a case the mode switching signal is detected by the switching signal detection unit.

With the second communication unit being able to be switched from the power save mode to the normal mode by using the first communication scheme (human body communication), communication based on the second communication scheme can be realized without a user operating the information processing apparatus.

(Notes)

The portable terminal 100 and the information processing apparatus 200 are examples of a communication device. The human body communication units 114 and 214 and means providing the wireless LAN, the BT, or the like are examples of a second communication unit and a third communication unit. The activation signal detection unit 115 is an example of a first communication unit and a switching signal detection unit. The activation signal is an example of a mode switching signal. The activation signal detection unit 115 and the baseband unit 122 are examples of a switching control unit. The activation type is an example of type information. The OOK signal is an example of a modulated carrier. The application units 102 and 202 are examples of an arithmetic processing unit. The activation signal transmission unit 215 is an example of a first communication unit and a switching signal transmission unit.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-131344 filed in the Japan Patent Office on Jun. 8, 2010, the entire content of which is hereby incorporated by reference.

What is claimed is:

1. A communication device comprising:
    a first communication processing circuit configured to perform communication by a communication scheme, the communication scheme being for applying voltage from a signal electrode that is in contact with or that is brought into proximity of a human body, generating an electric near field on a human body surface and performing transmission;
    a second communication processing circuit, different from the first communication processing circuit;
    a switching signal detection processing circuit configured to detect, from signals intermittently received by the first communication processing circuit, a mode switching signal for switching the second communication processing circuit from a power save mode to a normal mode, the mode switching signal including type information for causing the second communication processing circuit to be selected as a target to be switched from the power save mode to the normal mode; and a switching control processing circuit configured to select the second communication processing circuit, as the target to be switched from the power save mode to the normal mode, based on the type information included in the mode switching signal detected by the switching signal detection processing circuit, and configured to switch the second communication processing circuit from the power save mode to the normal mode when the mode switching signal is detected by the switching signal detection processing circuit.

2. The communication device according to claim 1, further comprising:

a third communication processing circuit, different from the first and second communication processing circuits, wherein the switching control processing circuit is further configured to select from among the second communication processing circuit and the third communication processing circuit as the target to be switched from the power save mode to the normal mode.

3. The communication device according to claim 1, wherein the mode switching signal is an unmodulated carrier.

4. The communication device according to claim 1, wherein the mode switching signal is a combination of an unmodulated carrier and a modulated carrier.

5. The communication device according to claim 1, further comprising:

an arithmetic processing circuit configured to generate transmission data, wherein the second communication processing circuit is further configured to transmit the transmission data generated by the arithmetic processing circuit after being switched from the power save mode to the normal mode by the switching control processing circuit.

6. The communication device according to claim 1, wherein the second communication processing circuit is a wireless communication processing circuit providing a wireless LAN function, and wherein a channel number for connecting to an access point, identification information of the access point, and key information used for encryption are included in the mode switching signal.

7. A communication device comprising:

a signal electrode to which voltage is to be applied;

a first communication processing circuit configured to perform communication by a communication scheme, the communication scheme being for applying voltage to the signal electrode that is in contact with or that is brought into proximity of a human body, generating an electric near field on a human body surface and performing transmission;

a second communication processing circuit, different from the first communication processing circuit; and a switching signal transmission processing circuit configured to transmit, by the first communication processing circuit, a mode switching signal for causing a communication device, corresponding to the second communication processing circuit, of a counterpart device to switch from a power save mode to a normal mode, the mode switching signal including type information for causing the communication device, corresponding to the second communication processing circuit, of the counterpart device to be selected as a target to be switched from the power save mode to the normal mode.

8. The communication device according to claim 7, wherein the mode switching signal is an unmodulated carrier.

9. The communication device according to claim 7, wherein the mode switching signal is a combination of an unmodulated carrier and a modulated carrier.

10. The communication device according to claim 7, further comprising:

an arithmetic processing circuit configured to generate transmission data, wherein the second communication processing circuit is further configured to transmit the transmission data generated by the arithmetic processing circuit after the communication device of the counterpart device is switched from the power save mode to the normal mode according to the mode switching signal transmitted by the switching signal transmission processing circuit.

11. The communication device according to claim 10, further comprising:

a touch pad for a user to input information by touching it with a part of a body, wherein the signal electrode is placed near the touch pad.

12. The communication device according to claim 10, further comprising:

a mouse connected by wire or wirelessly, wherein at least the signal electrode is provided in the mouse.

13. The communication device according to claim 7, wherein the second communication processing circuit is a wireless communication processing circuit providing a wireless LAN function, and wherein a channel number for connecting to an access point, identification information of the access point, and key information used for encryption are included in the mode switching signal.

14. A communication system comprising:

a first communication device including a first communication processing circuit configured to perform communication by a communication scheme, the communication scheme being for applying voltage from a signal electrode that is in contact with or that is brought into proximity of a human body, generating an electric near field on a human body surface and performing transmission, a second communication processing circuit, different from the first communication processing circuit, a switching signal detection processing circuit configured to detect, from signals intermittently received by the first communication processing circuit, a mode switching signal for switching the second communication processing circuit from a power save mode to a normal mode, the mode switching signal including type information for causing the second communication processing circuit to be selected as a target to be switched from the power save mode to the normal mode, and a switching control processing circuit configured to select the second communication processing circuit, as the target to be switched from the power save mode to the normal mode, based on the type information included in the mode switching signal detected by the switching signal detection processing circuit, and configured to switch the second communication processing circuit from the power save mode to the normal mode when the mode switching signal is detected by the switching signal detection processing circuit; and a second communication device including
a third communication processing circuit configured to perform communication by a same communication scheme as the first communication unit, and
a switching signal transmission processing circuit configured to transmit, by the third communication processing circuit, the mode switching signal for causing the second communication processing circuit of the first communication device to switch from the power save mode to the normal mode.

15. A mode switching method performed by a communication device including a first communication processing circuit configured to perform communication by a communication scheme, the communication scheme being for applying voltage from a signal electrode that is in contact with or that is brought into proximity of a human body, generating an electric near field on a human body surface and performing transmission, and a second communication processing circuit, different from the first communication processing circuit, the mode switching method comprising the steps of:

detecting, from signals intermittently received by the first communication processing circuit, a mode switching signal for switching the second communication processing circuit from a power save mode to a normal mode, the mode switching signal including type information for causing the second communication processing circuit to be selected as a target to be switched from the power save mode to the normal mode;
selecting the second communication processing circuit as the target to be switched from the power save mode to the normal mode based on the type information included in the mode switching signal; and
switching the second communication processing circuit from the power save mode to the normal mode when the mode switching signal is detected in the step of detecting.

16. A non-transitory computer readable storage medium including computer executable instructions, wherein the instructions, when executed by a computer including a first communication processing circuit configured to perform communication by a communication scheme, the communication scheme being for applying voltage from a signal electrode that is in contact with or that is brought into proximity of a human body, generating an electric near field on a human body surface and performing transmission, and a second communication processing circuit, different from the first communication processing circuit, cause the computer to perform a method, the method comprising:

detecting, from signals intermittently received by the first communication processing circuit, a mode switching signal for switching a communication mode of the second communication processing circuit from a power save mode to a normal mode, the mode switching signal including type information for causing the second communication processing circuit to be selected as a target to be switched from the power save mode to the normal mode;
selecting the second communication processing circuit as the target to be switched from the power save mode to the normal mode based on the type information included in the mode switching signal; and
switching the communication mode of the second communication processing circuit from the power save mode to the normal mode when the mode switching signal.

* * * * *